Oct. 4, 1927.
E. R. CAIN ET AL
1,644,464
CULINARY IMPLEMENT
Filed Dec. 14 1926
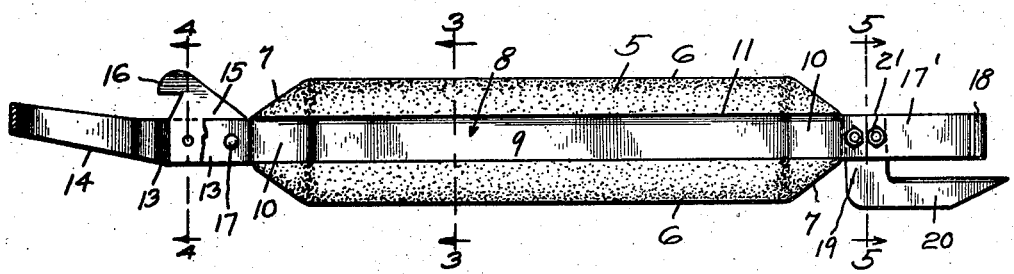
Fig. 1.
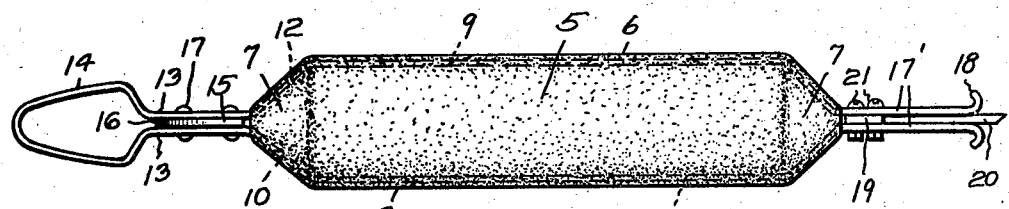
Fig. 2.
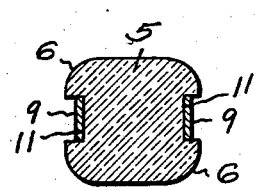   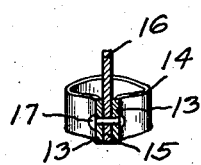   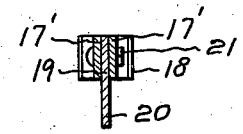
Fig. 3.        Fig. 4.         Fig. 5.
Inventors
ERNEST R. CAIN AND
CLAUDE R. McMILLAN,
By B. M. Welburn
Attorney Patented Oct. 4, 1927.

1,644,464

UNITED STATES PATENT OFFICE.

ERNEST R. CAIN AND CLAUDE R. McMILLAN, OF KINGSTREE, SOUTH CAROLINA.

CULINARY IMPLEMENT.

Application filed December 14, 1926. Serial No. 154,793.

The present invention relates to culinary implements.

An important object of the invention is to provide a culinary implement adapted to perform a number of functions ordinarily arising in a kitchen or the like.

A further object of the invention is to provide a device of the above mentioned character, which is convenient in use, simple in construction, cheap to manufacture, and has a high degree of utility.

Other objects and advantages of the invention will be apparent during the course of the following description.

In the accompanying drawings, forming a part of this specification and in which like numerals are employed to designate like parts throughout the same, Fig. 1 is a side elevation of an implement embodying the invention, Fig. 2 is a plan view of the same, Fig. 3 is a transverse section taken on line 3—3 of Fig. 1, Fig. 4 is a similar view taken on line 4—4 of Fig. 1, and Fig. 5 is a similar view taken on line 5—5 of Fig. 1.

In the drawings, wherein for the purpose of illustration is shown a preferred embodiment of our invention, the numeral 5 designates a handle or body portion, the edges 6 of which are rounded, for convenience of grasping the same in the hand. The ends of this handle or body portion are longitudinally tapered outwardly, as shown at 7. The handle 5 is formed of a non-metallic sharpening material, such as emery stone, carborundum, or the like. This non-metallic material has a much lower heat conductivity than the metal frame to be described.

We provide a metallic strap 8, which is bent upon itself between its ends, providing a main intermediate frame, including spaced parallel sides 9, and outwardly converging end extensions 10. The sides 9 are inserted within longitudinal grooves 11, and extensions 10 are inserted within grooves 12, formed upon the tapered ends 7. These grooves are preferably deeper than the thickness of the strap 8, whereby the outer surface of the handle 5 extends outwardly beyond the outer faces of these straps. This prevents the hand from freely contacting with these straps, and further permits a knife or the like being sharpened upon the body portion 5 without engaging the sides 9.

The converging extensions 10, at one end of the handle 5, are continued outwardly in the form of spaced parallel arms 13, carrying a loop 14 formed integral therewith. This loop tapers outwardly and serves as a stovelid lifter. Arranged between the arms 13 is a shank 15 of a jaw 16, and this shank is rigidly attached to the arms by rivets 17 or the like. The jaw 16 coacts with the loop 14 to form a crown cap remover. The arms 13 form the shank of a flat handle portion and the loop 14 serves as a head for this shank and prevents the fingers slipping from the shank. The shank 15 is in the form of a flat plate, and stiffens and reinforces the handle portion or shank provided by the arms 13.

The converging extensions 10 at the opposite end of the handle 5 are continued in the form of parallel arms 17', the ends of which are bent laterally or spread, as shown at 18. Arranged between the arms 17' is a shank 19 of a cutter blade 20, the forward end of which is pointed, as shown. This shank is rigidly attached to the arms 17' by rivets or bolts 21 or the like. The blade 20 coacts with the arms 17' to produce a can opener. The arms 17' form the shank of a handle portion, and the ends or extensions 18 constitute a head to prevent the fingers slipping from the shank. The shank 19 is in the form of a flat plate, and serves to stiffen and reinforce the shank formed by the arms 17'.

When the device is used as a stove-lid lifter, the handle 5 is grasped by the operator, and the loop 14 engaged with the stove lid. The strap 8 is formed of metal, and the non-metallic handle 5 will, therefore, function as a heat insulator. When the body portion 5 is being employed to sharpen a knife or the like, the device may be held by the operator grasping either the lid-lifting end or the can-opening end of the frame, projecting beyond the opposite ends of the same. These ends serve as headed handles as explained. These handles projecting beyond the ends of the body portion 5 protect the same from injury, if the device falls and strikes on its end. The device may be used as a crown cap remover or as a can opener, by grasping the body portion 5, and properly manipulating the implement, as is obvious.

It is to be understood that the form of our invention, herewith shown and described, is to be taken as a preferred example of the same, and that various changes in the shape, size, and arrangement of parts may be resorted to without departing from the spirit of our invention, or the scope of the subjoined claims.

Having thus described our invention, we claim:—

1. A culinary implement of the character described, comprising a non-metallic body portion serving as a heat-insulating handle and also adapted to be used in sharpening edged implements, said body portion being provided with longitudinal grooves, a metallic frame embodying spaced sides held within said grooves, said sides extending beyond one end of the body portion to provide arms carrying a loop, said arms constituting the shank of a handle portion and the loop extending laterally beyond said arms and constituting a head to prevent the fingers from slipping from the shank, and a member arranged between said arms and attached thereto to reinforce and stiffen the same.

2. A culinary implement of the character described, comprising a non-metallic body portion serving as a heat-insulating handle and also adapted to sharpen edged implements and provided with longitudinal grooves, a metallic frame having longitudinal sides held within said grooves, said sides extending beyond the ends of the body portion in the form of pairs of spaced parallel arms constituting the shanks of handle portions, said arms being provided at their outer ends with laterally bent extensions to prevent the fingers slipping from said shanks, and reinforcing and stiffening members arranged between the pairs of arms and rigidly attached thereto.

3. A culinary implement of the character described, comprising a non-metallic body portion serving as a heat insulating handle and also adapted to sharpen edged implements, said body portion being provided upon its opposite sides with longitudinal grooves, a metallic frame having longitudinal sides held within said grooves, said grooves being sufficiently deep whereby the outer faces of the body portion extend outwardly beyond the outer faces of said frame sides, said frame sides extending beyond one end of the body portion and in the form of a pair of straight parallel arms arranged in close relation and constituting a shank of a handle portion, said arms being provided at their outer ends with a loop extending laterally beyond the same and serving as a stop to prevent the fingers from slipping off of said arms, and a reinforcing and stiffening member arranged between the arms and contacting therewith and rigidly secured thereto.

In testimony whereof we affix our signatures.

CLAUDE R. McMILLAN.
ERNEST R. CAIN.